United States Patent
Anguelov et al.

(10) Patent No.: US 8,209,143 B1
(45) Date of Patent: Jun. 26, 2012

(54) ACCURATE ALIGNMENT OF MULTIPLE LASER SCANS USING A TEMPLATE SURFACE

(75) Inventors: Dragomir Anguelov, San Francisco, CA (US); Qi-xing Huang, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/881,929

(22) Filed: Sep. 14, 2010

Related U.S. Application Data

(60) Provisional application No. 61/242,710, filed on Sep. 15, 2009.

(51) Int. Cl.
G01C 17/38 (2006.01)
G01C 9/00 (2006.01)
G01C 19/00 (2006.01)
(52) U.S. Cl. .......... 702/150; 702/95
(58) Field of Classification Search .......... 702/150, 702/95
See application file for complete search history.

(56) References Cited

U.S. PATENT DOCUMENTS

| | | | | |
|---|---|---|---|---|
| 5,471,541 | A * | 11/1995 | Burtnyk et al. | 382/153 |
| 8,060,254 | B2 * | 11/2011 | Myeong et al. | 700/253 |
| 2008/0117205 | A1 * | 5/2008 | Storti et al. | 345/420 |
| 2011/0082585 | A1 * | 4/2011 | Sofman et al. | 700/259 |

OTHER PUBLICATIONS

Qi-Xing et al., "High Quality Pose Estimation by Aligning Multiple Scans to a Latent Map", Feb. 7, 2010.*

ThinkExist.com/Dictionary, Definition of "Odometer", 1999.*
Bailey, T. and H. Durrant-Whyte, "Simultaneous localization and mapping (SLAM): Part 2," IEEE Robotics and Automation Magazine, 13:108-117, 2006.
Besl, Paul J. and Neil D. McKay, "A method for registration of 3-D shapes," IEEE Transactions on Pattern Analysis and Machine Intelligence—Special Issue on Interpretation of 3-D scenes—Part II, vol. 14, No. 2, Feb. 1992, pp. 239-256.
Bezdek, James C. and Richard J. Hathaway, "Convergence of alternating optimization," Neural, Parallel & Scientific Computations, vol. 11, Issue 4, Dec. 2003, pp. 351-368.
Bosse et al., "An Atlas framework for scalable mapping," IEEE International Conference on Robotics and Automation (ICRA), Sep. 2003, pp. 1899-1906.
Cox, Ingemar J., "Blanche—An Experiment in Guidance and Navigation of an Autonomous Robot Vehicle," IEEE Transactions on Robotics and Automation, vol. 7, No. 2, Apr. 1991, 12 pages.
Curless, Brian and Marc Levoy, "A Volumetric Method for Building Complex Models from Range Images," In SIGGRAPH '96: Proceedings of the 23$^{rd}$ annual conference on computer graphics and interactive techniques, pp. 303-312, 1996.
Diebel, et al., "A Bayesian Method for Probable Surface Reconstruction and Decimation," from ACM Transactions on Graphics 25(1), Jan. 2006, 20 pages.

(Continued)

Primary Examiner — Michael Nghiem
(74) Attorney, Agent, or Firm — Sterne, Kessler, Goldstein & Fox P.L.L.C.

(57) ABSTRACT

A system and process for laser scan alignment for vehicle trajectories is provided. A representation of the map surface allows multiple scans to be simultaneously aligned to each other. Laser scans are fit to the template surface, and the template surface is re-estimated based on the fit of the scans. The result is a pose trajectory estimate that drifts less than standard approaches, and is more robust to outliers (such as moving objects) in the laser's field of view.

9 Claims, 15 Drawing Sheets

OTHER PUBLICATIONS

Durrant-Whyte, Hugh and Tim Bailey, "Simultaneous Localization and Mapping: Part 1," IEEE Robotics & Automation Magazine, Jun. 2006, pp. 99-108.

Elfes, Alberto, "Occupancy Grids: A probabilistic framework for robot perception and navigation," PhD Thesis, Carnegie-Mellon University, Pittsburgh, PA, 1989, 190 pages.

Eliazar, Austin I. and Ronald Parr, "DP-SLAM 2.0," Department of Computer Science, Duke University, Durham, NC, 2004, 7 pages.

Gelfand et al., "Robust Global Registration," Eurographics Symposium on Geometry Processing, 2005, 10 pages.

Grisetti et al., "Improving Grid-based SLAM with Rao-Blackwellized Particle Filters by Adaptive Proposals and Selective Resampling," In IEEE International Conference on Robotics and Automation (ICRA), 2005, 6 pages.

Gutmann, Jens-Steffen and Kurt Konolige, "Incremental Mapping of Large Cyclic Environments," in Proceedings of the IEEE International Symposium on Computational Intelligence in Robotics and Automation (CIRA), 2000, 8 pages.

Howard, Andrew and Nicholas Roy, The Robotics Data Set Repository (Radish), http://radish.sourceforge.net, 2003, 2 pages.

Huang et al., "Bayesian Surface Reconstruction via Iterative Scan Alignment to an Optimized Prototype," Eurographics Symposium on Geometry Processing, 2007, 11 pages.

Liu, Y. et al., "Using EM to Learn 3D Models of Indoor Environments with Mobile Robots," in IEEE International Conference on Machine Learning (ICML), 2001, 8 pages.

Lu, F. and E. Milios, "Globally Consistent Range Scan Alignment for Environmental Mapping," Autonomous Robots 4, Kluwer Academic Publishers, 1997, pp. 333-349.

Lu, Feng and Evangelos Milios, "Robot Pose Estimation in Unknown Environments by Matching 2D Range Scans," 1997, 38 pages.

Martin, Christian and Sebastian Thrun, "Real-Time Acquisition of Compact Volumetric Maps with Mobile Robots," in IEEE International Conference on Robotics and Automation (ICRA, 2002), 6 pages.

Montemerlo et al., "FastSLAM 2.0: An Improved Particle Filtering Algorithm for Simultaneous Localization and Mapping that Provably Converges," in Proceedings of the Sixteenth International Joint Conference on Artificial Intelligence (IJCAI), Acapulco, New Mexico, 2003, pp. 1151-1156.

Neugebauer, Peter, "Reconstruction of Real-World Objects Via Simultaneous Registration and Robust Combination of Multiple Range Images," International Journal of Shape Modeling, vol. 3, No. 1&2, 1997, pp. 71-90.

Ohtake et al., "Multi-level Partition of Unity Implicits," in the ACM SIGGRAPH conference proceedings, 2003, 9 pages.

Pottman et al., "Geometry and convergence analysis of algorithms for registration of 3D shapes," in International Journal of Computation Vision, 67(3), 2006, pp. 277-296.

Rusinkiewicz, Szymon and Marc Levoy, Efficient Variants of the ICP Algorithm, 2001, 8 pages.

Ryde, Julian and Huosheng Hu, "3D Mapping with Multi-Resolution Occupied Voxel Lists," in Autonomous Robots, 2009, 18 pages.

Thrun, S., "An Online Mapping Algorithm for Teams of Mobile Robots," in International Journal of Robotics Research, 2001, 37 pages.

Thrun et al., Probabilistic Robotics, The MIT Press, 2005, 647 pages.

Thrun et al., "A Real-Time Algorithm for Mobile Robot Mapping with Applications to Multi-Robot and 3D Mapping," in IEEE International Conference on Robotics and Automation, San Francisco, CA, 2000, 8 pages.

Thrun et al., "Autonomous Exploration and Mapping of Abandoned Mines," in IEEE Robotics & Automation Magazine, vol. 11, Issue 4, Dec. 2004, pp. 79-91.

Yguel et al., "Wavelet Occupancy Grids: a Method for Compact Map Building," in International Conference on Field and Service Robotics, 2005, 12 pages.

Thrun et al., "A Probabilistic Approach to Concurrent Mapping and Localization for Mobile Robots," Machine Learning and Autonomous Robots (joint issue), 31/5, 1998, pp. 1-25.

Hähnel et al., "Map Building with Mobile Robots in Populated Environments," IEEE International Conference on Intelligent Robots and Systems, 2002, 6 pages.

Montemerlo, Michael and Sebastian Thrun, "Simultaneous Localization and Mapping with Unknown Data Association Using FastSLAM," IEEE International Conference on Robotics and Automation, 2003, 7 pages.

Nieto et al., "Recursive scan-matching SLAM," Robotics and Autonomous Systems 55, 2007, pp. 39-49.

\* cited by examiner

---- With Wheel
—— Without Wheel

ACCURATE ALIGNMENT OF MULTIPLE LASER SCANS USING A TEMPLATE SURFACE

CROSS REFERENCE TO RELATED APPLICATIONS

The present application claims the benefit of U.S. Provisional Patent Application No. 61/242,710, filed on Sep. 15, 2009, entitled "Accurate Alignment of Multiple Laser Scans Using a Template Surface" by Anguelov et al., which is incorporated herein by reference in its entirety.

BACKGROUND

1. Field

Embodiments of the present invention relate to estimating vehicle trajectories, specifically optimizing the pose of a vehicle to reduce drift.

2. Related Art

Laser range-finders have become standard equipment in mobile robotics, where they are used for simultaneous localization and mapping (SLAM) tasks, both for computing a local robot trajectory (i.e., the incremental movement of the robot and the environment geometry) and for estimating loop-closing constraints.

Scan matching is typically performed between pairs of scans, using variants of the original iterative closest point (ICP) method, which aligns scan points to scan points or scan points to line segments. Scan point to scan point alignment is further described in, for example, F. Lu and E. Milios, "Robot pose estimation in unknown environments by matching 2d range scans," *Journal of Intelligent and Robotic Systems*, 18:249-275, 1997, which is incorporated by reference herein in its entirety. Scan point to line segment alignment is further described in, for example, I. Cox, "Blanche: an experiment in guidance and navigation of an autonomous robot vehicle," *IEEE Trans. on Robotics and Automation*, 7(2): 193-204, 1991, which is incorporated by reference herein in its entirety. However, these approaches have had mixed success due to the nature of the laser data. Standard lasers can often have poor resolution (on the order of 1 degree per laser reading), which causes distant surfaces to be sparsely sampled. The laser scans also contain outliers and noise, due to surface reflectance and to moving objects in the environment. Because it is difficult to handle these issues robustly using pairs of scans at a time, standard scan matching algorithms can produce errors that cause the estimated pose to deviate significantly from the true trajectory. In the absence of absolute pose information in the form of GPS or building maps, these errors can grow arbitrarily large.

A less popular alternative to ICP has been to replace both scans using histograms and solve the matching using the maximum of a cross correlation function. Such an approach is further described in, for example, G. Weiss and E. Puttamer, "A map based on laserscans without geometric interpretation," *Intelligent Autonomous Systems*, pp. 403-407, 1995, which section is incorporated herein by reference. It has been known that aligning groups of scans to each other can produce more accurate results, but because of the computational complexity associated with a quadratic number of scan pairs, only a very small number of scans can be handled efficiently in this manner.

A very popular class of SLAM methods, based on occupancy grid maps, have used an occupancy grid map representation to align scans. SLAM based on occupancy grid maps is further described in, for example, S. Thrun, D. Fox, and W. Burgard, "A probabilistic approach to concurrent mapping and localization for mobile robots," *Machine Learning*, 31, 1998, which is incorporated by reference herein in its entirety. Occupancy grid maps represent environments by fine-grained, metric grids of binary variables that encode whether the corresponding cells are free or occupied. Occupancy grids make the definition of Monte Carlo sampling algorithms fairly straightforward and many such algorithms have been developed. Monte Carlo algorithms maintain multiple discrete alignment hypotheses using particles to increase the robustness of the SLAM algorithms with regards to matching errors (Monte Carlo methods have also been successfully used in conjunction with scan matching, but at the cost of increased implementation complexity). Despite the success of these methods in preventing large alignment errors, the occupancy grid map representation is inherently discrete and does not support the estimation of local gradients, which prevents the robot pose from being determined locally with high precision. As a result, a large number of particles and diverse sampling schemes need to be employed to ensure that the correct trajectory has been sampled. The locally imprecise poses can accumulate to cause large drift over time.

Additional alternative approaches to reduce drift errors include utilizing a known map of the environment and manual pose corrections by an operator. Each of these requires additional data, which may not be available.

BRIEF SUMMARY

The capability to calculate the pose of a vehicle and generate a map while minimizing drift is provided.

The scan matching problems described above may be addressed by efficiently aligning multiple scans at the same time. For efficiency and stability concerns, the scan area is split into grid cells, and the grid resolution is adjusted during alignment. A coarse grid is used at the start of the optimization, when the scans are not very well aligned, to ensure that the neighborhood of each cell is big enough to contain data points from different scans. As the alignment proceeds, the grid resolution is iteratively increased such that the latent map captures the details of the underlying scene.

According to an embodiment of the present invention, such alignment is performed as follows. An area covered by a plurality of laser scans is split into a first set of grid cells. A first template surface representation, also referred to herein as a latent map, for each grid cell in the first set of grid cells is estimated using original poses determined for the plurality of laser scans. The original poses may be computed from roughly-aligned scans or from, for example, wheel encoder information. The first template surface representation comprises a set of piecewise linear functions referred to herein as surfels over a spatial grid at a predefined resolution.

Once the first template surface representation is estimated, each laser scan in the plurality of laser scans is aligned to the first template surface representation to provide an updated pose for each scan in the plurality of laser scans. The area covered by the plurality of laser scans is then split into a second set of grid cells. Each cell in the second set of grid cells may be smaller than the cells in the first set of grid cells, such that the surfels of the spatial grid have a higher resolution than in the first template surface representation. A second template surface representation for each grid cell in the second set of grid cells is estimated using the updated pose for each scan in the plurality of laser scans. This process of aligning the plurality of laser scans to the template surface can be repeated multiple times until convergence, and the resolution of the template surface is gradually increased to match the improved scan registration.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, similar reference numbers may indicate identical or functionally similar elements. The drawing in which an element first appears is generally indicated by the left-most digit in the corresponding reference number.

FIG. 1 is an illustration showing how multiple scans of an unknown surface may be obtained according to an embodiment of the present invention.

FIGS. 2a, 2b, 2c, and 2d illustrate a series of alignment iterations according to an embodiment of the present invention.

FIGS. 5a, 5b, 5c, and 5d illustrate experimental results of a method according to an embodiment of the present invention.

Figure 6A:
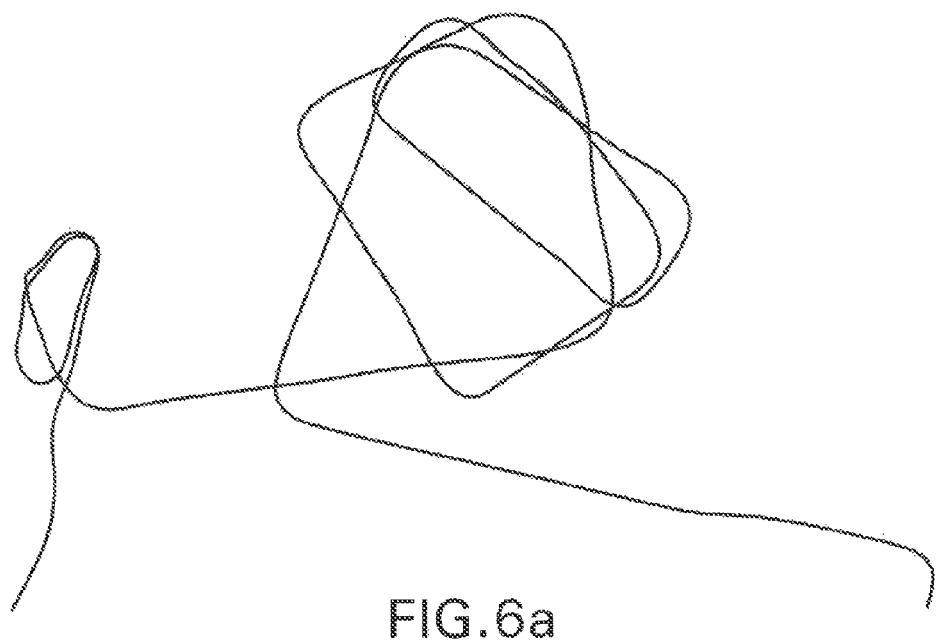
Figure 6B:
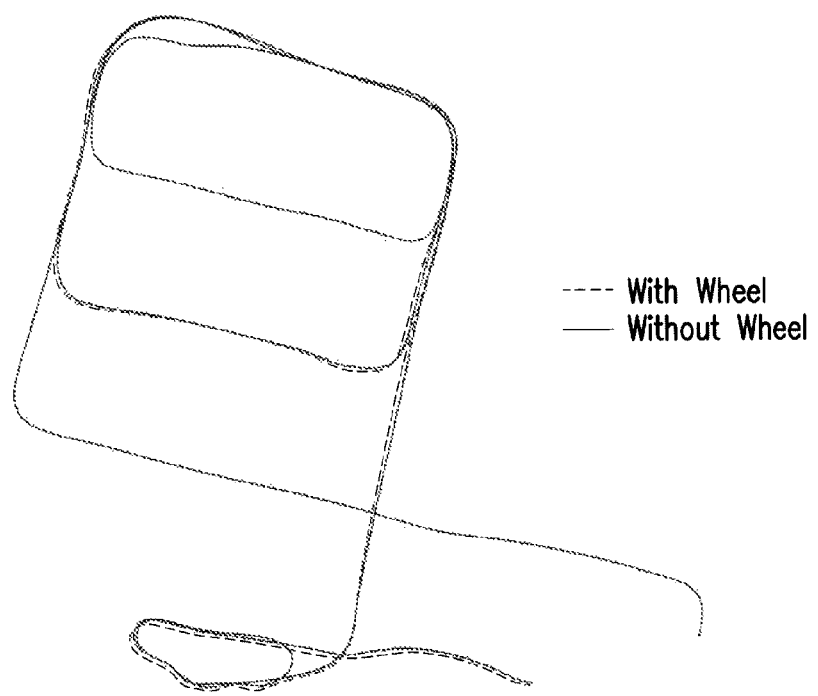
Figure 6C:
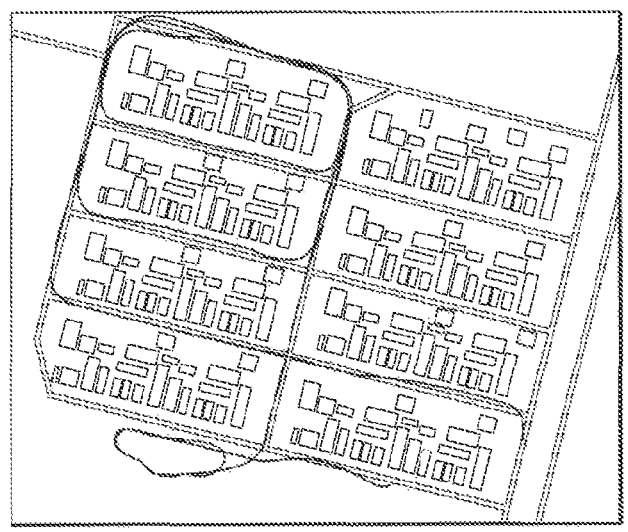

FIGS. 6a, 6b, and 6c illustrate additional experimental results of a method according to an embodiment of the present invention.

Figure 7A:
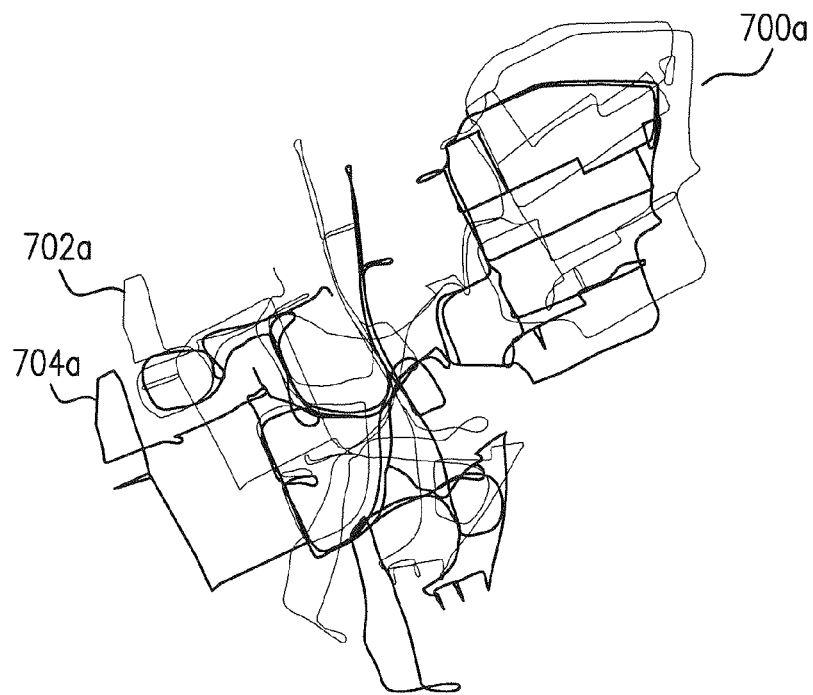

FIG. 7a illustrates an estimated pose comparison with ground truth for a pairwise alignment.

Figure 7B:
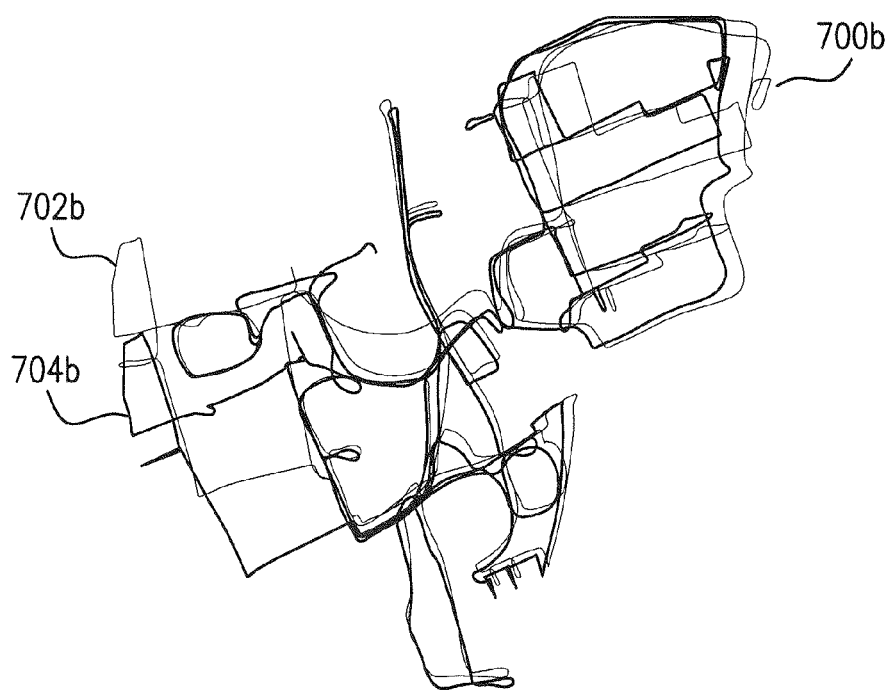

FIG. 7b illustrates an estimated pose comparison with ground truth for a method according to an embodiment of the present invention.

Figure 8:
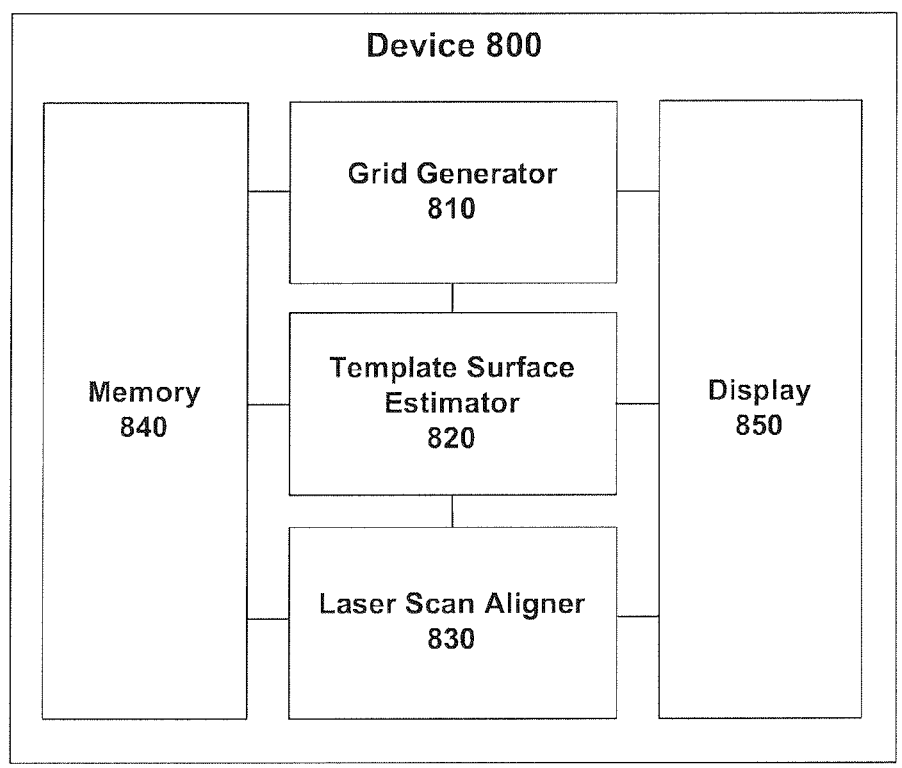

FIG. 8 illustrates a diagram of an embodiment of an exemplary device in which embodiments can be implemented.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

I. LASER SCAN GENERATION

Figure 1:
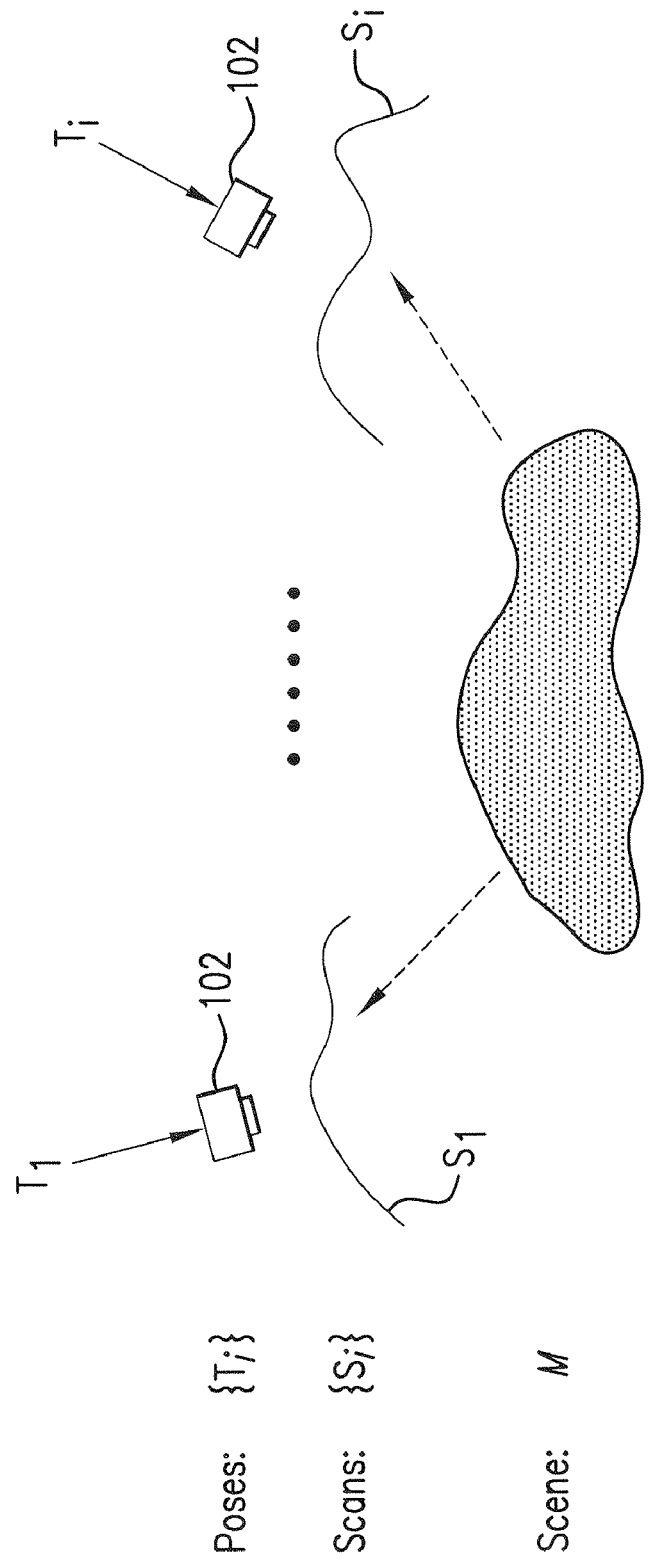

FIG. 1 is an illustration showing how multiple scans of an unknown surface may be obtained according to an embodiment of the present invention. As illustrated in FIG. 1, a robot 102 is equipped with a horizontal laser scanner which explores the scene, whose geometry is denoted as M. M will be referred to as the latent map of the scene, as it is not provided beforehand to robot 102. Although two-dimensional scanning will be referred to herein, one of skill in the art will recognize that the invention is also applicable to three-dimensional scanning and surface map generation. For example, robot 102 may be equipped with three-dimensional sensors, and the scene explored may be the entire three-dimensional volume of space surrounding robot 102. Examples of such three-dimensional sensors include, but are not limited to, rotating laser scanners, laser cameras, stereoscopic cameras, and other types of three-dimensional scanners. The robot observations comprise a set of range scans at n poses $T_i$ where $1 \leq i \leq n$. For example, scan $S_1$ is obtained when robot 102 is at pose $T_1$. Similarly, scan Si is obtained when robot 102 is at pose Ti. Each pose $T_i$ is a rigid 2D transform relating a robot coordinate system $\Sigma_i$ to a latent map coordinate system $\Sigma$. Each scan $S_i$ contains $n_i$ data points $s_{ij}$ where $1 \leq j \leq n_i$. The Cartesian coordinates of each data point $s_{ij}$ in the local coordinate system $\Sigma_i$ is denoted as $s_{ij}$. Available rough information about the surface normal for each data point $s_{ij}$ is denoted as $n_{ij}$.

In this setting, the goal is to estimate the poses $\{T_i\}$ from the input range scans $\{S_i\}$. The unknown map M is treated as a hidden variable and optimized together with the poses $\{T_i\}$. As will be further shown, incorporating M into the optimization process enables the multiple scan alignment problem to be handled in a more robust and efficient way.

In probabilistic terms, the multiple scan alignment problem is formulated as finding the most likely global scan poses $\{T_i\}^*$ and the most likely latent map M* which maximize the posterior probability:

$$M^*, \{T_i^*\} = \arg\max_{M,\{T_i\}} P(M, \{T_i\} \mid \{S_i\}). \tag{1}$$

Using Bayes' rule, the posterior probability is expanded as follows:

$$P(M, \{T_i\} \mid \{S_i\}) = \frac{P(\{S_i\} \mid M, \{T_i\}) \cdot P(M, \{T_i\})}{P(\{S_i\})} \tag{2}$$

Assuming the priors on the latent map M and the scan poses $\{T_i\}$ are independent, and taking the logarithm of the objective produces:

$$M^*, \{T_i^*\} = \arg\min_{M,\{T_i\}} (-\log P(\{S_i\} \mid M, \{T_i\}) - \log P(M) - \log P(\{T_i\})) \tag{3}$$

The right hand side of the objective function contains three terms: the data likelihood term, the map prior term, and the pose prior term. Their detailed expressions are presented as follows.

A. Data Term

To simplify the data likelihood term, it is assumed that data points are sampled independently from the underlying scene:

$$-\log P(\{S_i\} \mid \{T_i\}, M) = -\sum_{i=1}^{n} \sum_{j=1}^{n_i} \log P(S_{ij} \mid T_i, M) \tag{4}$$

The terms $\log P(\{S_i\}|\{T_i\},M)$ depends on how the latent map M is parameterized. Most scenes are well approximated by a piecewise-linear model and maintain a grid representation of the latent map. Each grid cell $c_k$ that contains scan points is associated with a local line segment, called surfel, which can be described in terms of a point $p_k$ and an associated normal vector $n_k$. Then, the signed distance from a point x in the neighborhood of cell $c_k$ to the surfel can be expressed as:

$$d(x, e_k) = (x - p_k)^T n_k.$$

A standard way to define the data likelihood term is to consider the squared distance from a point to the surfel corresponding to its cell location. A slightly different formulation is chosen here, which forces the surfels associated with neighboring cells to be consistent with each other. The set $N(c_k)$ of each cell $c_k$ is defined as the 3×3 subgrid centered at $c_k$. Then, the data likelihood term for each point is the sum of squared distances from this point to its neighboring surfels:

$$-\log P(s_{ij} \mid T_i, M) = \sum_{T_i(s_{ij}) \in N(c_k)} \frac{1}{\sigma_k^2} ((T_i(s_{ij}) - p_k)^T n_k)^2, \quad (5)$$

where $\sigma_k$ is the standard deviation for the surfel at cell $c_k$. Note that different standard deviations are allowed for different cells, in order to be able to distinguish between objects such as walls, bushes, and moving objects. The optimal values of $\sigma_k$ are determined through optimization of the objective function.

In many indoor cases, there are thin objects such as building walls, doors, or panels. To distinguish points from different sides of such thin surfaces, a very dense grid would need to be used to ensure that each cell contains only points from one side of the wall. In practice, increasing the grid resolution to this level drastically decreases the efficiency of the method. Instead, as illustrated by the advanced cell in FIG. 3b, two surfels are used for those cells which contain scan points with opposite normal orientations. In this case, the distance from a data point to each cell is defined as its distance to the surfel whose normal direction agrees with the normal associated with each data point.

B. Map Prior Term

If the piece-wise linear scene model is an accurate description of the scene, then the standard deviation $\sigma_k$ of each cell should be close to the standard deviation value $\sigma_0$, which is the expected accuracy of the laser scanner. For example, $\sigma_0$ may be set to 0.02 meters.

Based on this observation, the map prior term may be defined as:

$$-\log P(M) = \lambda_M \sum_{c_k \in M} |\sigma_k - \sigma_0|. \quad (6)$$

Here the weight $\lambda_M$ controls the importance of the map prior tenth. In the exemplary embodiment described herein, $\lambda_M = 1000$.

B. Pose Prior Term

Additional sensors such as wheel encoders are typically available on most robotic platforms. Here an optional term is introduced that uses the wheel sensor input to constrain the relative vehicle poses. The wheel-based relative transformation between poses $\Sigma_i$ and $\Sigma_{i+1}$ is denoted as $T_{i,i+1}^w$. If the wheel sensor is precise, then there is a constraint that $T_{i+1} = T_i \circ T_{i,i+1}^w$. The operator $\circ$ is defined by the following matrix inequalities:

$$R_{i+1} = R_i \cdot R_{i,i+1}^w, \quad t_{i+1} = R_i \cdot t_{i,i+1}^w + t_i, \quad (6)$$

where R and t represent the rotation and translation components, respectively, of the corresponding rigid 2D transformations.

The pose prior term that enforces the above-specified constraints is specified as follows:

$$-\log P(\{T_i\}) = \lambda_T \sum_{i=1}^{n-1} (\lambda_R \|R_{i+1} - R_i \cdot R_{i,i+1}^w\|_F^2 + \|t_{i+1} - t_i - R_i \cdot t_{i,i+1}^w\|_F^2). \quad (7)$$

Above, $\|\cdot\|_F$ stands for the Frobenius matrix norm. The parameter $\lambda_T$ controls the strength of the pose prior term, while $\lambda_R$ controls the relative importance of the rotation constraints ($\lambda_R = 0.1$ in the example described herein). How to choose $\lambda_T$ will be discussed below.

II. OPTIMIZATION

A straight-forward approach to solve the optimization problem described in Eq. 3 is to apply non-linear optimization techniques directly to optimize all the unknowns. However, this approach is extremely inefficient.

Figure 2A:
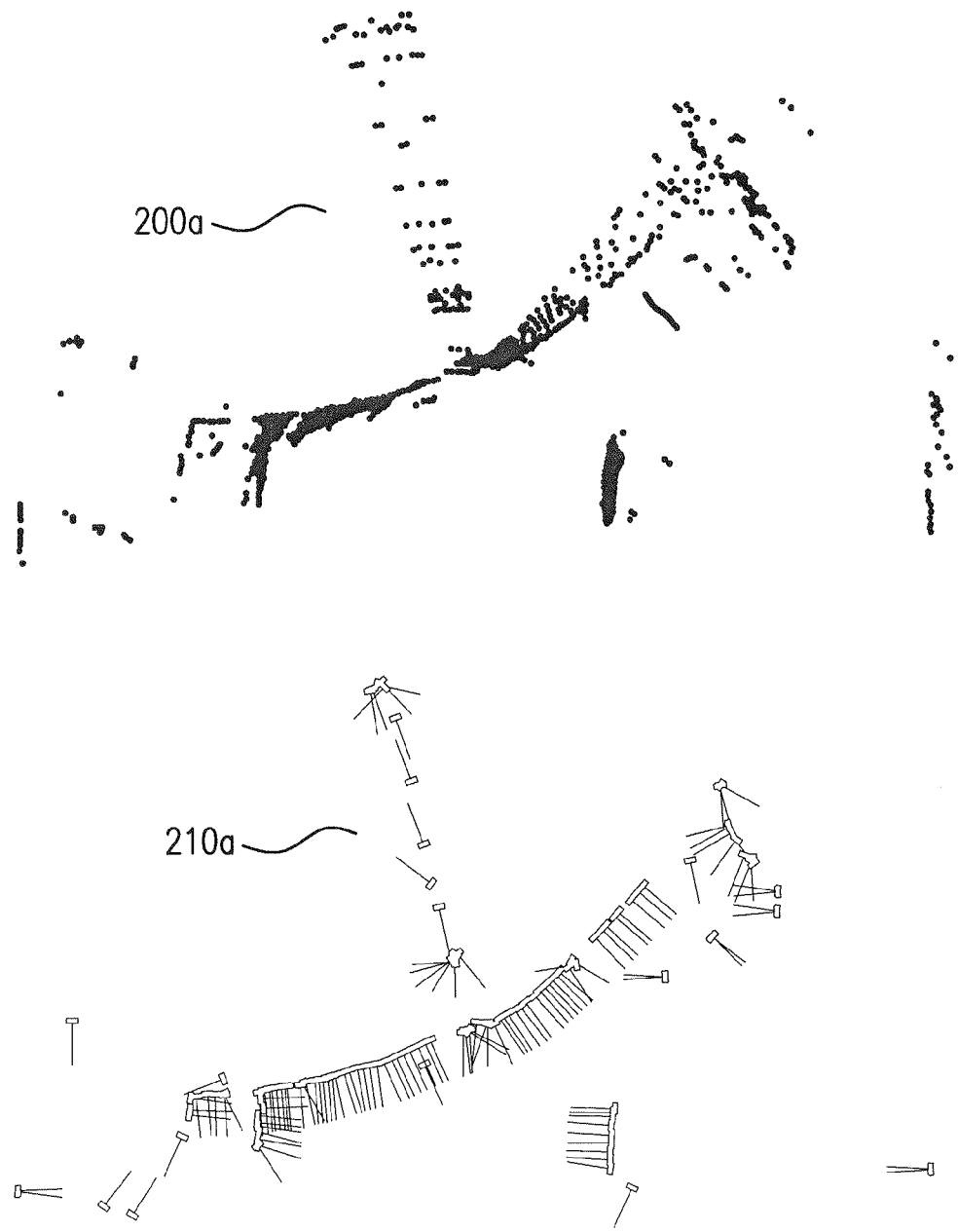
Figure 2B:
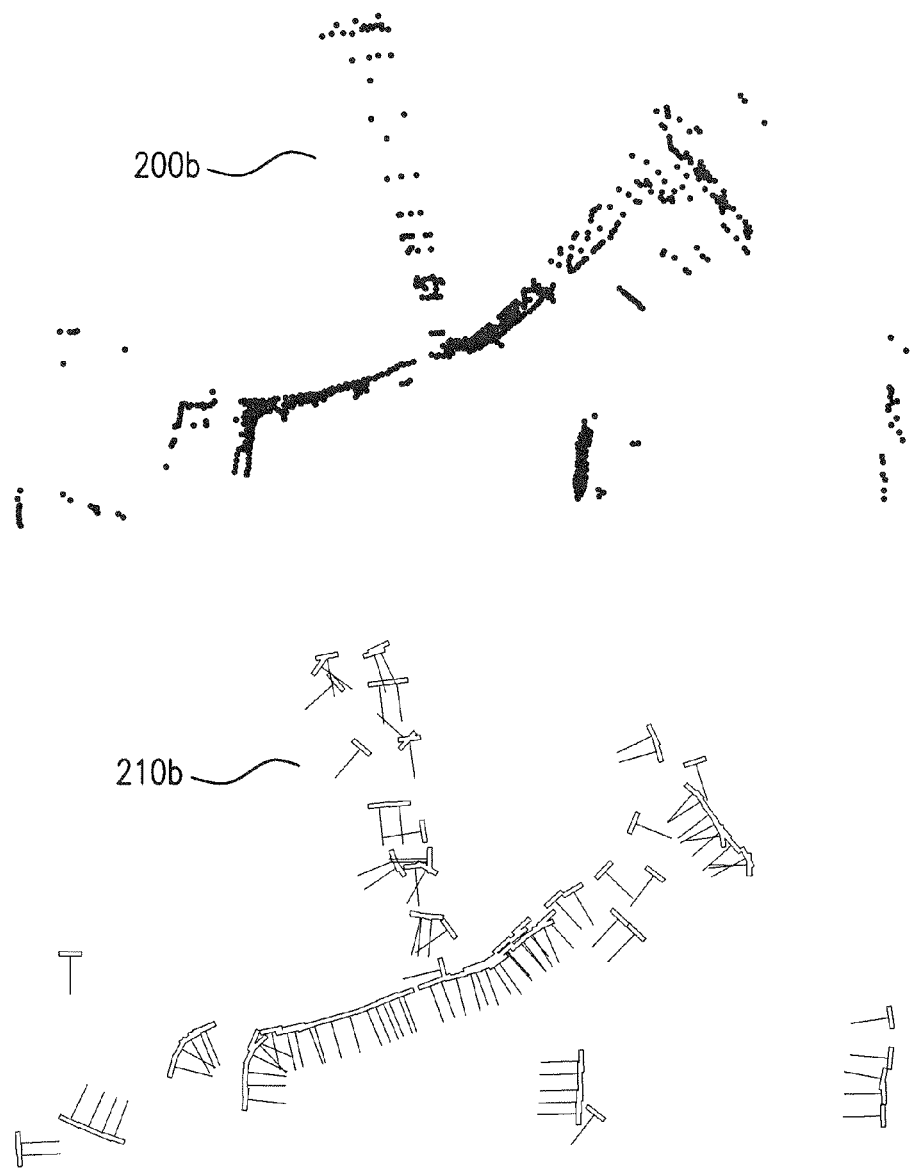
Figure 2C:
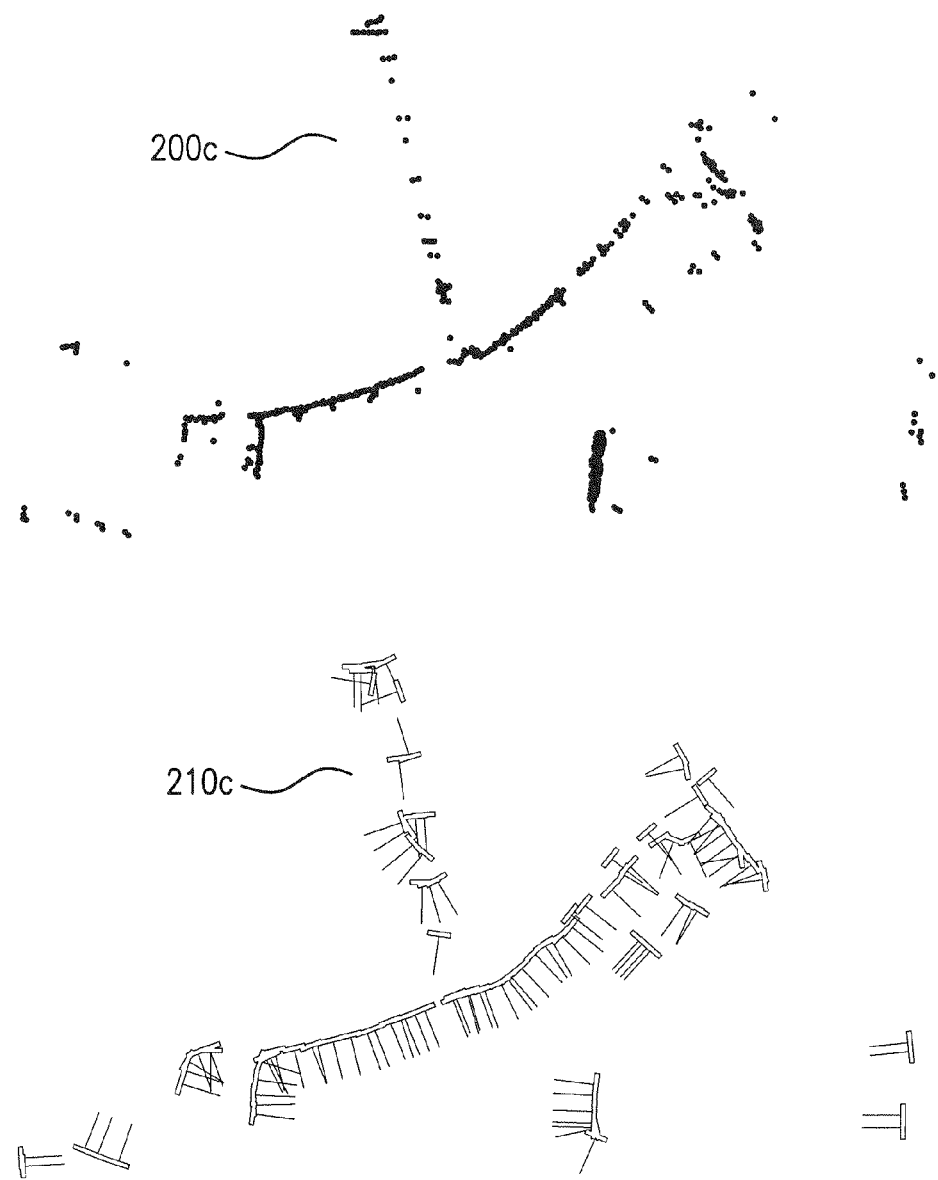
Figure 2D:
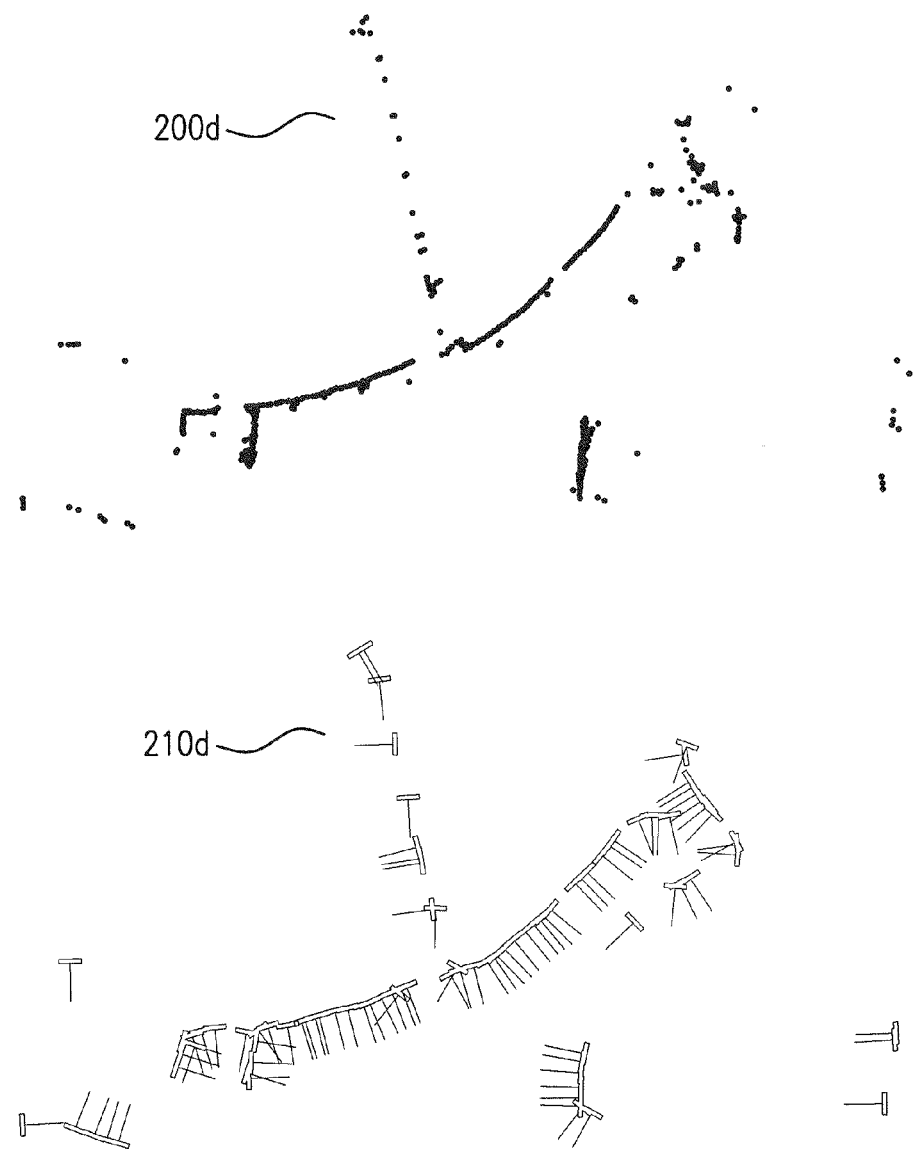

The optimization strategy according to an embodiment of the invention is to alternate between optimizing the latent map M and optimizing the scan poses $\{T_i\}$. FIGS. 2a-2d illustrate this concept. FIGS. 2a-2d illustrate the alignment of 20 exemplary scans simultaneously according to an embodiment of the present invention. In the embodiment of FIGS. 2a-2d, FIG. 2a represents an initial status, FIG. 2b represents a first iteration, FIG. 2c represents a third iteration, and FIG. 2d represents a tenth iteration. Accordingly, 200a, 200b, 200c, and 200d show the poses of the scans for each selected iteration, while 210a, 210b, 210c, and 210d show the respective latent maps generated from the scan poses for each selected iteration. At each step, the data points are first fixed to optimize the latent map M. This can be formulated as computing:

$$M^* = \arg\min_{M} -\log P(\{S_i\} \mid M, \{T_i\}) - \log P(M). \quad (8)$$

Then the latent map is fixed and the scan poses are optimized such that the data points are optimally aligned with the latent map:

$$\{T_i^*\} = \arg\min_{\{T_i\}} -\log P(\{S_i\} \mid M, \{T_i\}) - \log P(\{T_i\}) \quad (9)$$

The convergence rate of alternating optimization is linear. In an experimental setting, 10-30 iterations were found sufficient for convergence.

A. Latent Map Optimization

Substituting Eqs. 4, 5, and 6 into Eq. 8, the objective function in latent map optimization is described as:

$$f_{map} = \sum_{i=1}^{n} \sum_{j=1}^{n_i} \sum_{s_{ij}' \in N(c_k)} \frac{(s_{ij}' - p_k)^T n_k)^2}{\sigma_k^2} + \lambda_M \sum_{c_k \in M} |\sigma_k - \sigma_0|$$

Switching the indices, $f_{map}$ can be rewritten as:

$$f_{map} = \sum_{c_k} \left( \sum_{s'_{ij} \in N(c_k)} \frac{(s'_{ij} - p_k)^T n_k)^2}{\sigma_k^2} + \lambda_M |\sigma_k - \sigma_0| \right). \quad (10)$$

It is easy to see that cells are decoupled in $f_{map}$. Thus, each cell can be optimized independently. Moreover, the optimal values of p and n are independent of $\sigma_k$ and can be optimized first.

For each cell $c_k$, the optimal values of p and n are found at:

$$P_k^*, n_k^* = \underset{p,n}{\operatorname{argmin}} \sum_{s'_{ij} \in N(c_k)} (s'_{ij} - p_k)^T n_k)^2 \quad (11)$$

Figure 3A:
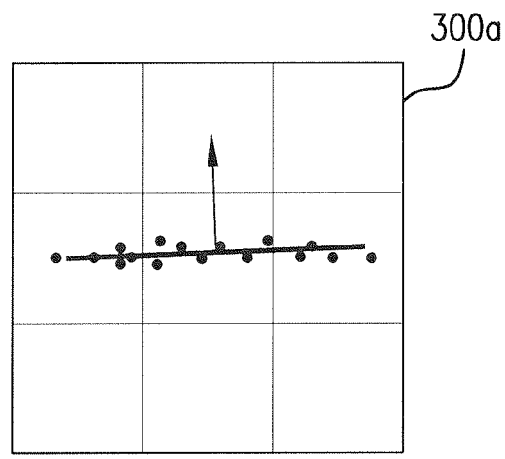
FIG. 3a illustrates a pose estimation setup for a simple cell according to an embodiment of the present invention.

FIG. 3 illustrates a pose estimation setup for each of a simple cell (containing one surfel) and an advanced cell (containing two or more surfels with different normals). The optimization problem described in Eq. 11 is a line fitting problem which can be solved by principal component analysis (PCA) (see FIG. 3(a)). The optimal value of p is given as the barycenter of the data points:

$$P_k^* = \sum_{s'_{ij} \in N(c_k)} s'_{ij} \bigg/ \sum_{s'_{ij} \in N(c_k)} 1. \quad (12)$$

The optimal value of n is found by computing the first eigenvector of the covariance matrix:

$$\left( \sum_{s'_{ij} \in N(c_k)} (s'_{ij} - p_k^*) \cdot (s'_{ij} - p_k^*)^T \right) n_k^* = \lambda_k n_k^* \quad (13)$$

Multiplying both sides of Eq. 13 by $n^{*T}$ provides:

$$\lambda_k = \sum_{s'_{ij} \in N(c_k)} ((s'_{ij} - p_k^*)^T n_k^*)^2. \quad (14)$$

Thus, the optimal value of $\sigma_k$ is found at:

$$\sigma_k^* = \underset{\sigma_k}{\operatorname{argmin}} \left( \frac{\lambda_k}{\sigma_k^2} + \lambda_M |\sigma_k - \sigma_0| \right) \quad (15)$$

$\sigma_k^*$ can be computed in the closed form as:

$$\sigma_k^* = \max\left( \sigma_0, \left( \frac{2\lambda_k}{\lambda_M} \right)^{\frac{1}{3}} \right). \quad (16)$$

How moving objects are handled by the method of the present invention can be understood by Eq. 16. For those cells which contain moving objects, the values of $\lambda_k$ would be high. It follows that the standard deviations of these cells would be high. This means that the contribution of these cells to the objective function is small, which is desired.

Figure 3B:
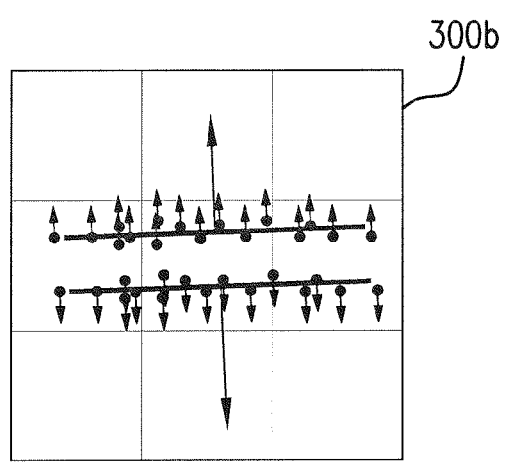
FIG. 3b illustrates a pose estimation setup for an advanced cell according to an embodiment of the present invention.

Thus far, only the case where each cell only contains one surfel has been considered. However, the extension to handle advanced cells is also an aspect of the present invention. As illustrated in FIG. 3(b), it is tested whether the data points contained within a given cell can be divided into two groups of points with consistent normal directions. If so, a surfel is generated from each group of data points by applying the procedure described above.

Dividing a set of normal vectors into two groups of consistent normal vectors is a standard classification problem. A greedy algorithm is used which works well in practice. Two sets of normal vectors $P_1$ and $P_2$ are maintained. Each group $P_i$ is associated with a cumulative normal vector $n_{P_i}$. Each normal vector is incrementally inserted into one of these two sets. Given a normal vector n, it is inserted into $P_1$ if $n_{P_1}^T n < n_{P_2}^T n$. Otherwise, $s_{ij}$ is inserted into group $P_2$. After inserting n into $P_i$, $n_{P_i} = n_{P_i} + n$.

The advantage of using advanced cells is that the two sides of a wall can be represented at moderate resolution. On the other hand, the construction process is slower than the case where only regular cells are present.

For efficiency and stability reasons, the grid resolution is adjusted during alignment. A coarse grid is used when the optimization starts to ensure that the neighborhood of each cell is big enough to contain data points from different scans. As the alignment proceeds, the grid resolution is iteratively increased such that the latent map captures the details of the underlying scene.

B. Pose Optimization

Substituting Eqs. 4, 5, and 7 into Eq. 9, the objective function in the pose optimization step can be described as follows:

$$f_{pose} = \sum_{i=1}^{n} \sum_{j=1}^{n_i} \sum_{s'_{ij} \in N(c_k)} \frac{((R_i s_{ij} + t_i - p_k)^T n_k)^2}{\sigma_k^2} + \quad (17)$$

$$\lambda_P \sum_{i=1}^{n-1} (\lambda_R \|R_{i+1} - R_i \cdot R_{i,i+1}^w\|^2 + \|t_{i+1} - t_i - R_i \cdot t_{i,i+1}^w\|^2).$$

$f_{pose}$ is of the form of non-linear least squares which can be optimized very efficiently using the Gauss-Newton method.

To apply the Gauss-Newton method, each rotation $R_i$ is parameterized as:

$$R_i(\theta_i) = \begin{pmatrix} \cos \theta_i & -\sin \theta_i \\ \sin \theta_i & \cos \theta_i \end{pmatrix}$$

Under this parameterization, the first order approximation of $R_i$ at current angle $\theta_i^c$ is given by:

$$R_i(\theta_i) \approx R_i(\theta_i^c) - \begin{pmatrix} \sin\theta_i^c & \cos\theta_i^c \\ -\cos\theta_i^c & \cos\theta_i^c \end{pmatrix} (\theta_i - \theta_i^c) \quad (18)$$

Thus, at each step of the Gauss-Newton optimization, Eq. 18 is substituted into Eq. 17 and $f_{pose}$ is optimized to find the optimal values of $\theta_i$, $t_i$ at the next step. Note that in this case $f_{pose}$ is quadratic in the unknowns and can be optimized by solving a linear system.

III. POSE ESTIMATION

The multiple scan alignment method can be applied to estimate the trajectory of a moving robot within an environment. The present embodiment will be described for an off-line pose estimation where all the laser scans are previously known. However, one of skill in the art will understand that the multiple scan alignment method described herein can be easily adapted for on-line pose estimation. For example, the scan alignment method may be performed in real-time or faster to allow accurate pose estimation while the robot is in motion.

The simplest strategy is to take all the available scans as input to the multiple scan alignment algorithm. However, this strategy would fail if the size of the trajectory is big, because a good initial position is not known. Instead, the poses are estimated in a multi-grid fashion, improving scan poses gradually by performing scan alignment at different levels. The poses computed at a current level can then be input to the pose estimation at the next level.

Figure 4A:
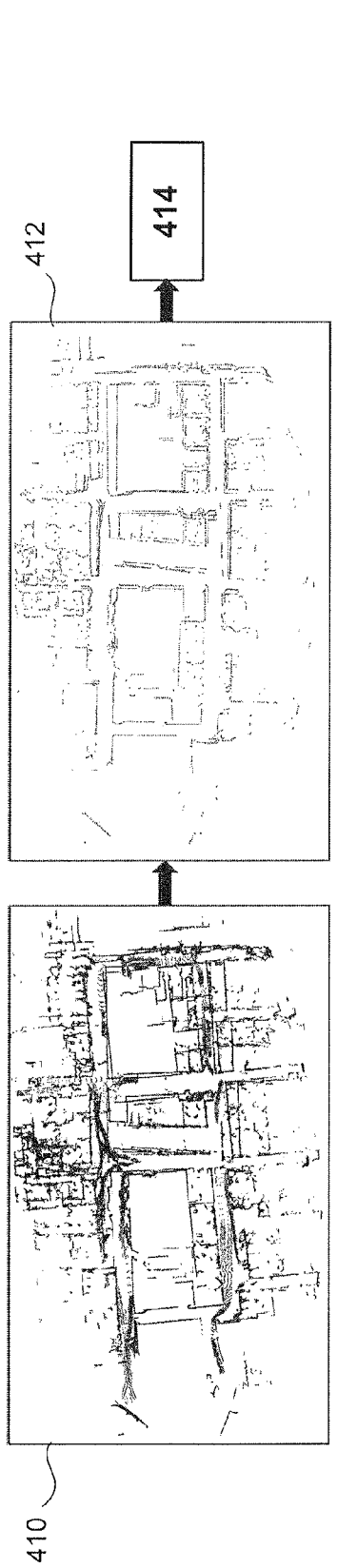
FIG. 4a illustrates local alignment and a latent map generated from varying numbers of laser scans, according to an embodiment of the present invention.
Figure 4B:
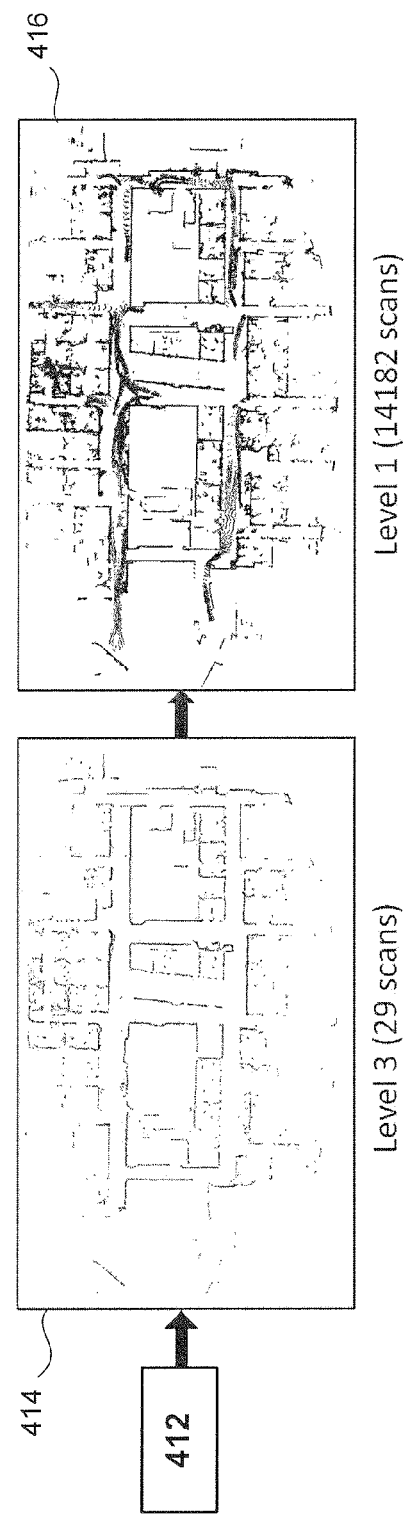
FIG. 4b illustrates global alignment and the latent map generated from the varying number of laser scans, according to an embodiment of the present invention.

FIGS. 4a and 4b illustrate a multi-resolution pose estimation framework according to an embodiment of the present invention. In an embodiment, FIG. 4a illustrates local alignment and a latent map generated from varying numbers of laser scans. In a further embodiment, FIG. 4b illustrates global alignment and the latent map generated from the varying number of laser scans. For example, FIG. 4a shows a scan level 410 that represents a scan level of 14182 scans and a scan level 412 that represents a scan level of 29 scans. Also, for example, FIG. 4b shows a scan level 414 that represents a scan level of 29 scans and a scan level 416 that represents a scan level of 14182 scans. Scan levels 410 and 412 of FIG. 4a show the result of a local alignment method according to an embodiment of the present invention. Scan levels 414 and 416 show the result of a global alignment method according to an embodiment of the present invention. As illustrated in FIGS. 4a and 4b, for example, the pose estimation algorithm proceeds in two phases: a local alignment phase and a global alignment phase.

In the local alignment phase, the optimization hierarchy is built. Each level of the hierarchy includes a set of scans. The scans at the first level are the input scans. To build the scan at the next level, the scans at the current level are subdivided into overlapping groups, and the multiple scan alignment method is applied to the scans contained in each group. The scans at the next level are taken as the latent maps of each group. In an exemplary embodiment, the group size is set to be 10, and the overlap size between adjacent groups is set to be 4. This process is iterated until the number of scans at the current level is less than 10. One of skill in the art will recognize that these sizes and scan levels may be changed to suit the needs of a particular user.

The relative poses between adjacent latent maps can be extracted from scans that are shared by them. For each scan $S_i$ that is shared by two adjacent groups $M_k$ and $M_{k+1}$, the following two equations exist:

$$T_i = T_k \cdot T_{k,i}, T_i = T_{k+1} \cdot T_{k+1,i} \qquad (19)$$

where $T_{k,i}$ and $T_{k+1,i}$ are the optimal relative poses obtained from multiple scan alignments.

Combining the two equalities in Eq. 19, it follows:

$$T_{k+1} = T_k \cdot {}^k T_i \cdot {}^{k+1} T_i^{-1}. \qquad (20)$$

As $M_k$ and $M_{k+1 \ share}$ multiple scans, the relative poses between $T_{k+1}$ and $T_k$ is defined as the average of ${}^k T_i \cdot {}^{k+1} T_i^{-1}$ over all the shared scans. This averaged pose is also normalized such that it is a rigid transform.

In a global alignment phase, the method starts from the highest level and simultaneously optimizes all the scans contained within each level. The alignment result at the current level is used to generate the initial poses at the previous level. More precisely, suppose $T_k$ is computed, then the poses of its child scans can be computed as:

$$T_i = T_k \cdot {}^k T_i. \qquad (21)$$

Once again, the average operation is applied if a child scan is shared by two parent scans.

Another example of the pose estimation is shown in FIGS. 4a and 4b. In this example, having 14182 laser scans as input, 439 groups were created at the second level and 29 groups were created at the third level. As can be seen from FIG. 4a, the relative poses between neighboring scans are improved proceeding from the first level (14182 scans) to the third level (29 scans). FIG. 4b shows that the poses of all scans are made consistent in the global alignment phase.

IV. EXPERIMENTAL RESULTS

The inventors tested embodiments of the pose estimation algorithm on various data sets. FIGS. 5a-5d are illustrations of the results of a multiple scan alignment-based pose estimation method according to an embodiment of the present invention on real-world indoor data sets. Each of FIGS. 5a-5d shows the alignment of the results with the floor plans (ground truths) of various buildings. The aligned scans are superposed over the floor plans of the buildings, which were not available to the pose estimation algorithm at runtime. The zoom-in figures of the bottom rows of FIGS. 5a-5d (i.e., 506a, 508a, 506b, 508b, 506c, and 506d) show the latent maps returned by the method. For each data set, the accuracy of the method was evaluated in two ways. The local accuracy measure $a_l$ was defined as the averaged distance from the data points to the latent map. From the inventors' experiments, the inventors found that $a_l$ ranged from 2 cm to 4 cm, which is very close to the accuracy of the laser scanner used. The global accuracy $a_g$ was defined in terms of the floor plan associated with each data set. All the scans in the optimized poses were regarded as a single scan and aligned with the map. The global accuracy was defined as the averaged distance between the synthesized scan and the map in their overlapping regions. For the examples tested by the inventors, the global drift was less than 20 cm.

Figure 5A:
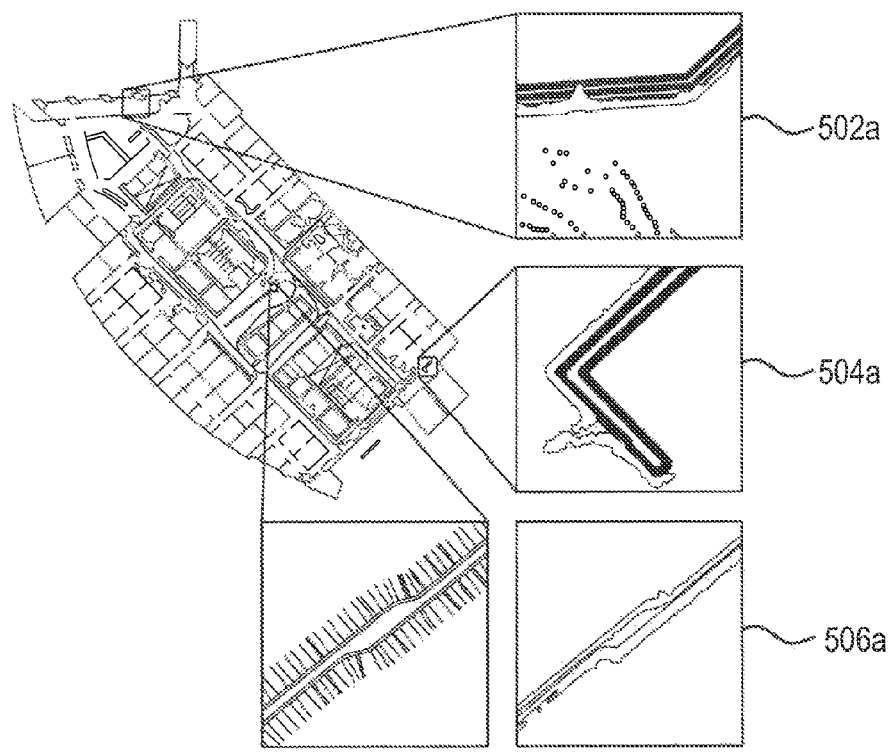
Figure 5B:
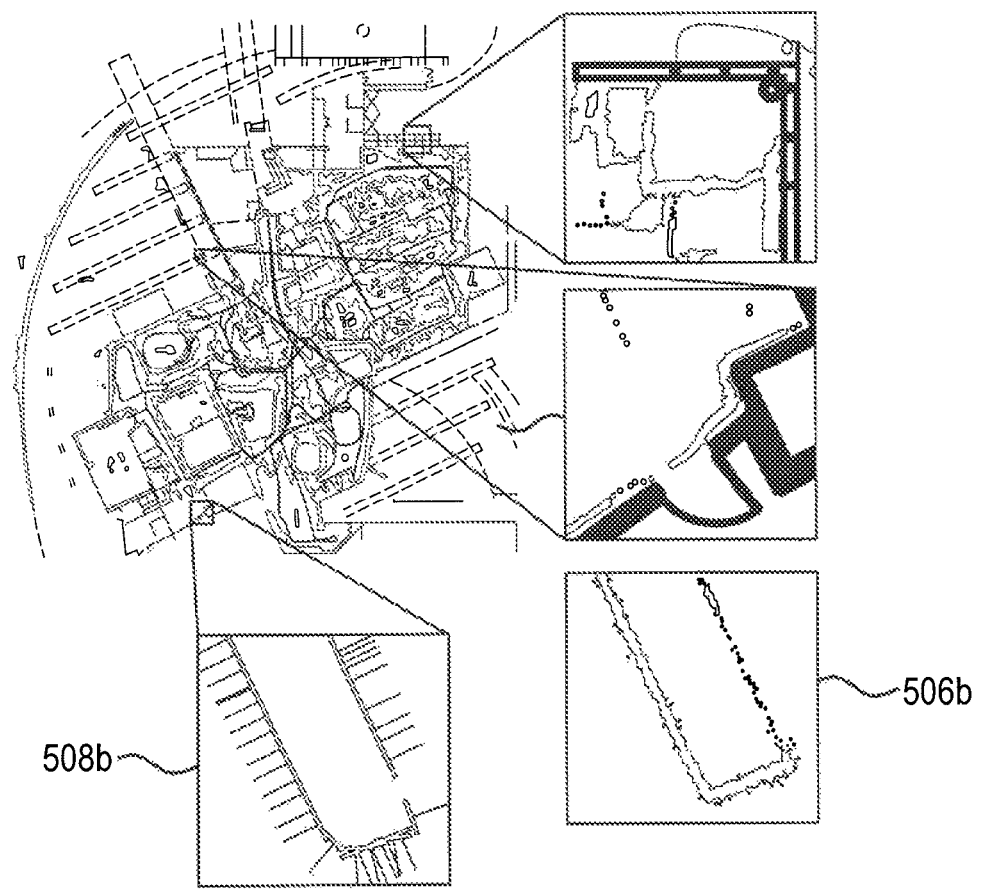
Figure 5C:
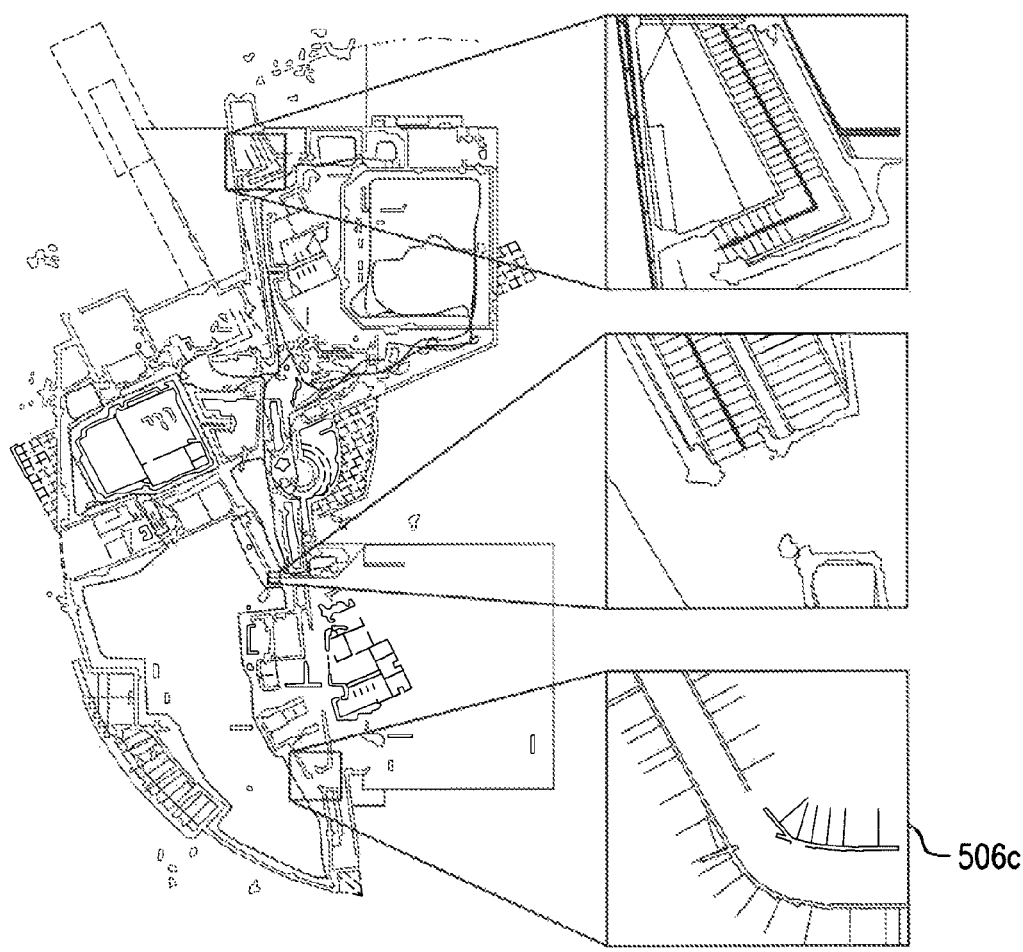

The first data set is shown in FIG. 5a. As this data set contains mostly flat walls and the loops in the trajectory are relatively small, the accuracy of the result is fairly high. Note that this data set contained a large number of moving people, which is accounted for by the method used.

The second data set is a first floor of a museum. (See FIG. 5b.) The challenge of this data set was that a portion of the environment contained many small panels which were surrounded by moving people. As can be seen, the latent map is not well defined in these areas. However, the results still returned decent pose.

The third data set is the second floor of the museum. (See FIG. 5c.) In this data set, there was a large loop in the trajectory. The method used successfully closed this loop.

Figure 5D:
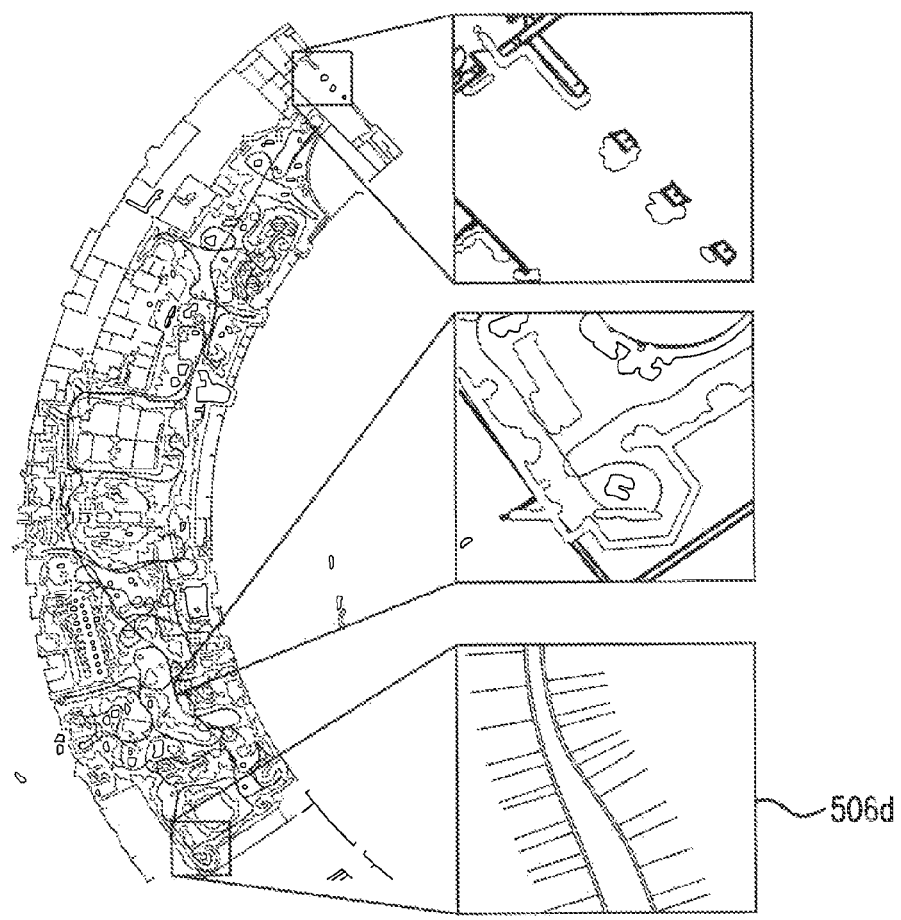

FIG. 5d illustrates similar results received for a fourth dataset, where the shape of the building is mostly curved.

FIGS. 6a-6c show an application of the algorithm to an outdoor example. As illustrated in FIG. 6a, the pose induced from the wheel sensor has salient global drift. However, as illustrated in FIG. 6b, even starting from the rough initial poses obtained from the wheel sensor, the poses improved after performing one step of local alignment according to an embodiment of the present invention. Regardless of whether the wheel prior term was used as the initial pose, or whether the initial pose relied upon the static pose prior term, they each led to a very similar result, shown in FIG. 6c—both the wheel prior pose and the static pose prior term converge to the same final pose after completing the pose estimation procedure according to an embodiment of the present invention. Even in this case, both the local accuracy and global accuracy of the poses estimated by a method of the present invention is fairly high.

To investigate the importance of having reasonable initial poses, the method was also tested by the inventors on an outdoor data set where a wheel sensor of the robot generated a poor result. The inventors also tested the method on the data set from the prior with which the robot is fixed. The pose estimation algorithm significantly improved the poses only after the first level. Moreover, the final poses in both cases were the same and were matched with a snapshot of the underlying scene.

Although the goal was to estimate the global poses of the scans, the global underlying maps generated by methods according to embodiments of the present invention are quite accurate. Returning to FIGS. 5a-5d, the inventors found that in many cases, the walls can be identified in the maps generated. This observation also shows that the methodology disclosed herein is quite accurate from another perspective. Since the underlying maps include a set of points with oriented normals, they can be used in many applications, such as floor plan reconstruction.

The pose estimation according to the present invention is very efficient. In an experiment by the inventors, a single run of the multiple alignment method on 10-20 scans took about 0.03 s on a computer with a 2.4 GHz CPU. The total processing time only took about ⅓ of the time that was spent on acquiring these data sets.

The pose estimation method according to an embodiment of the present invention was compared with a method based on aligning adjacent scans using pair-wise registration. For pair-wise registration, the standard ICP algorithm was employed with point-to-plane distance metrics. FIGS. 7a and 7b illustrate the comparison between the two methods. FIG. 7a illustrates an alignment 700a that represents the pair-wise alignment 702a compared with ground truth 704a; FIG. 7b illustrates an alignment 700b that represents pose estimation 702b according to an embodiment of the present invention compared with ground truth 704b. As shown by alignment 700b in FIG. 7b, the pose estimation method according to an embodiment of the present invention produced less drift than registering adjacent scans. Moreover, the pose estimation according to an embodiment of the present invention was found to be 2-3 times faster than the ICP algorithm. In this comparison, local alignment only at the first level was run.

V. EXEMPLARY SYSTEM

The methods described by FIGS. 1-7 may be implemented on, among other things, any device that can retrieve, download or view digital images from any form of a network. FIG. 8 illustrates a diagram of an embodiment of an exemplary client device 800 in which embodiments can be implemented. Device 800 includes a grid generator 810, a template surface estimator 820, a laser scan aligner 830, a memory 840, and a display 850. Accordingly, the methods described by FIGS. 1-7 may be implemented using grid generator 810, template surface estimator 820, and laser scan aligner 830, according to an embodiment of the present invention.

Device 800 can be any type of client device. Such a client device can include, but is not limited to, a personal computer, mobile device such as a mobile phone, workstation, embedded system, game console, television, set-top box, or any other computing device that can support image viewing or image retrieval. Such a client device includes, but is not limited to, a device having a processor and memory for executing and storing instructions. Such a client device may include software, firmware, and hardware or some combination thereof. The software may include one or more applications and an operating system. The hardware can include, but is not limited to, a processor, memory (e.g., memory 840) and user interface display (e.g., display 850). An optional input device, such as a mouse or other pointing device, may be used. The scans used in the alignment may be obtained from any suitable measurement device, for example and without limitation, a horizontal two-dimensional laser, a three-dimensional laser, or even sonar.

In an embodiment, grid generator 810, template surface estimator 820, laser scan aligner 830, memory 840, and display 850 may be communicatively coupled to one another via, for example, an internal bus of device 800. Although only grid generator 810, template surface estimator 820, laser scan aligner 830, memory 840, and display 850 are shown, it would be apparent to a person skilled in the art that device 800 may include additional components, modules, and/or sub-components as necessary.

In an embodiment, memory 840 is used to store information accessible by grid generator 810, template surface estimator 820, laser scan aligner 830. Information stored in memory 840 may include, but is not limited to, laser scan information such as, for example, wheel encoder information. Memory 840 may be any type of recording medium coupled to an integrated circuit that controls access to the recording medium. The recording medium can be, for example and without limitation, a semiconductor memory, a hard disk, or other similar type of memory or storage device.

In an embodiment, grid generator 810, template surface estimator 820, and laser scan aligner 830 may be configured to estimate laser scan poses in a multi-grid fashion, as described above. In an embodiment, the scan poses are received at grid generator 810 initially and improved gradually by performing scan alignment at different levels using template surface estimator 820 and laser scan aligner 830. For example, the poses computed at a current level can then be input to the pose estimation at the next level.

In an embodiment, grid generator 810 may be configured to split an area covered by a plurality of laser scans into a first set of grid cells. The first set of grid cells generated by grid generator 810 has an initial resolution that will gradually increase to match the improved scan registration using the pose estimation algorithm, as discussed above. Thus, in a further embodiment, grid generator 810 may be configured to continue splitting the area covered by the plurality of laser scans into further sets of grid cells as necessary.

A first template surface representation, also referred to herein as a latent map, for each grid cell generated by grid generator 810 is estimated by template surface estimator 820 according to an embodiment of the present invention. Template surface estimate 820 is configured to use original poses determined for the plurality of laser scans according to an embodiment of the present invention. The original poses may be computed from roughly-aligned scans or from, for example, wheel encoder information. As described above, the first template surface representation is represented as a set of piecewise linear functions referred to herein as surfels over a spatial grid at a predefined resolution.

Once the first template surface representation is estimated, laser scan aligner 830 is configured to align each laser scan to the first template surface representation estimated by template surface estimator 820 according to an embodiment of the present invention. Further, laser scan aligner is configured to provide an updated pose for each scan in the plurality of laser scans according to an embodiment of the present invention. The area covered by the plurality of laser scans is then split into a second set of grid cells. Each cell in the second set of grid cells may be smaller than the cells in the first set of grid cells, such that the surfels of the spatial grid have a higher resolution than in the first template surface representation.

Template surface estimator 820 is further configured to estimate a second template surface representation for each grid cell in the second set of grid cells using the scan poses updated by laser scan aligner 830 according to an embodiment of the present invention. In an embodiment, grid generator 810, template surface estimator 820, and laser scan aligner 830 are configured to repeat the process of aligning the plurality of laser scans to the template surface multiple times until convergence. The resolution of the template surface is thereby gradually increased to match the improved scan registration.

The estimated template surface representation may then be displayed by template surface estimator 820 to display 850 as a map of the area covered by the plurality of laser scans according to an embodiment of the present invention. Such a map may be superimposed over a floor plan of the area according to an embodiment of the present invention.

VI. CONCLUSION

Presented above as example embodiments of the present invention were methods for high quality pose estimation by aligning multiple scans to a latent map. This scan alignment method has several advantages over previous methods, which align pairs or groups of scans to each other and as a result suffer from the sparse data and noise present in those scans. Instead, the methodology disclosed herein explicitly reconstructs a latent map, and in the process can utilize data from a much larger number of scans. The latent map combines the strengths of implicit and explicit surface representations, such as fast point correspondence queries and high approximation power. Through its use of piecewise linear segments, the method according to an embodiment of the present invention includes an implicit bias towards straight-line surfaces, which are ubiquitous in man-made environments. The latent map is also able to deal implicitly with outliers such as moving objects, because each surfel in the latent map grid maintains an estimate of how well it approximates the readings in its corresponding grid cell, and is weighted accordingly when computing the scan alignment. Finally, the methods according to the present invention are very efficient. The reason for this is that they capture what is essentially a quadratic number of alignment constraints between all scan pairs using a linear number of constraints between each scan and the template surface. This allows the latent map to maintain implicit long-range relationships (e.g., between scan 1 and scan 100), which minimizes pose drift without incurring quadratic cost. As a result, methods according to embodiments of the present invention are at least as fast as a pairwise scan-matching method, applied on successive pairs of scans. Furthermore, the latent map can be very efficiently encoded in memory using an octree, which makes it applicable to both 2D and 3D scan alignment problems.

The scan alignment method according to an embodiment of the present invention is superior to standard scan alignment methods in several ways. Two key issues in aligning partially overlapped scans are how to define accurate distance fields from sparse samples and how to determine the overlapping region. These two issues are resolved automatically since the scans are only aligned with the latent map, which always contains the scans and has a well defined distance field. When aligning multiple scans, the complexity of standard methods is quadratic since they minimize the distances between all pairs of scans. In contrast, the complexity of the method is linear since all the scans are aligned with the latent map.

The method performs loop closing implicitly. More precisely, by introducing a latent map, scans that are far from each other in time but are close to each other in space are aligned in terms of this latent map. Moreover, it is not necessary to determine when and where to close the loop, because it is determined automatically by the algorithm.

In order for the pose estimation method of embodiments of the present invention to work, the laser scans should contain enough geometry from static objects so that poses can be estimated by aligning laser scans. This may be difficult when the robot is surrounded by moving people or the robot is moving in open fields.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-implemented method for laser scan alignment comprising:
   splitting, by a laser scan alignment computer, an area covered by a plurality of laser scans into a first set of grid cells, the first set of grid cells having a first resolution;
   estimating, by the laser scan alignment computer, a first template surface representation for the first set of grid cells using original poses of the plurality of laser scans;
   aligning, by the laser scan alignment computer, each laser scan in the plurality of laser scans to the estimated first template surface representation to provide a first updated pose for each laser scan in the plurality of laser scans;
   splitting, by the laser scan alignment computer, the area covered by the plurality of laser scans into a second set of grid cells, the second set of grid cells having a second resolution, wherein the second resolution of the second set of grid cells is finer than the first resolution of the first set of grid cells;
   estimating, by the laser scan alignment computer, a second template surface representation for the second set of grid cells using the first updated poses for the plurality of laser scans;

repeating, by the laser scan alignment computer, the splitting the area into the second set of grid cells, and the estimating the second template surface representation until the aligned plurality of laser scans substantially converges with the second template surface representation;

simultaneously aligning, by the laser scan alignment computer, the plurality of laser scans to each other to provide a final pose for each laser scan in the plurality of laser scans;

dividing, by the laser scan alignment computer, the plurality of laser scans into overlapping groups of laser scans; and providing the estimated second template surface representation to a display as a map of the area covered by the plurality of laser scans, wherein the splitting the area covered by the plurality of laser scans into the first set of grid cells comprises splitting the mea covered by each group of laser scans in the overlapping groups of laser scans into the first set of grid cells, and wherein the aligning each laser scan in the plurality of laser scans to the estimated first template surface representation comprises aligning each group of laser scans in the overlapping groups of laser scans to the estimated first template surface representation to provide the updated pose for each group of laser scans in the overlapping groups of laser scans.

2. A computer-implemented method for laser scan alignment comprising:

splitting, by a laser scan alignment computer, an area covered by a plurality of laser scans into a first set of grid cells, the first set of grid cells having a first resolution, wherein the splitting the area covered by the plurality of laser scans into the first set of grid cells further comprises approximating, by the laser scan alignment computer, a surface inside each grid cell in the first set of grid cells using a local line segment, the local line segment corresponding to a shape of the surface inside each grid cell in the first set of grid cells;

estimating, by the laser scan alignment computer, a first template surface representation for the first set of grid cells using original poses of the plurality of laser scans;

aligning, by the laser scan alignment computer, each laser scan in the plurality of laser scans to the estimated first template surface representation to provide a first updated pose for each laser scan in the plurality of laser scans;

splitting, by the laser scan alignment computer, the area covered by the plurality of laser scans into a second set of grid cells, the second set of grid cells having a second resolution, wherein the second resolution of the second set of grid cells is finer than the first resolution of the first set of grid cells;

estimating, by the laser scan alignment computer, a second template surface representation for the second set of grid cells using the first updated poses for the plurality of laser scans; and providing, by the laser scan alignment computer, the estimated second template surface representation to a display as a map of the area covered by the plurality of laser scans.

3. The method of claim 2, wherein the approximating the surface inside each grid cell comprises:

determining, by the laser scan alignment computer, a first normal orientation of a first set of scan points within each grid cell of the first set of grid cells;

determining, by the laser scan alignment computer, a second normal orientation of a second set of scan points within each grid cell of the first set of grid cells, wherein the second normal orientation is different from the first normal orientation; and approximating, by the laser scan alignment computer, the surface inside each grid cell in the first set of grid cells using the first and second local line segments corresponding to the respective first and second normal orientations.

4. The method of claim 2, wherein the estimating the first and second template surface representations comprises:

performing, by the laser scan alignment computer, principal component analysis for each grid cell of the respective first and second set of grid cells; and recovering, by the laser scan alignment computer, the local line segment and the standard deviations of laser scan points relative to the local line segment for each grid cell in the respective first and second set of grid cells.

5. A system for laser scan alignment comprising:

a grid generator configured to split an area covered by a plurality of laser scans into a first set of grid cells, the first set of grid cells having a first resolution, and to split the area covered by the plurality of laser scans into a second set of grid cells, the second set of grid cells having a second resolution, wherein the second resolution of the second set of grid cells is finer than the first resolution of the first set of grid cells, and wherein the grid generator is further configured to divide the plurality of laser scans into overlapping groups of laser scans and configured to split the area covered by each group of laser scans in the overlapping groups of laser scans into the first set of grid cells;

a template surface estimator configured to estimate a first template surface representation for the first set of grid cells using original poses of the plurality of laser scans and to estimate a second template surface representation for a second set of grid cells using updated poses for the plurality of laser scans; and a laser scan aligner configured to align each laser scan in the plurality of laser scans to the estimated first template surface representation to provide the updated pose for each laser scan in the plurality of laser scans, simultaneously align the plurality of laser scans to each other to provide a final pose for each laser scan in the plurality of laser scans, and align each group of laser scans in the overlapping groups of laser scans to the estimated first template surface representations to provide the updated pose for each group of laser scans in the overlapping groups of laser scans, wherein the laser scan aligner, the grid generator, and the template surface estimator are further configured to repeat the respective alignment, the split of the area into the second set of grid cells, and the estimation of the second template surface representation until the aligned plurality of laser scans substantially converges with the second template surface representation.

6. A system for laser scan alignment comprising:

a grid generator configured to split an area covered by a plurality of laser scans into a first set of grid cells, the first set of grid cells having a first resolution, to split the area covered by the plurality of laser scans into a second set of grid cells, the second set of grid cells having a second resolution, wherein the second resolution of the second set of grid cells is finer than the first resolution of the first set of grid cells, and to approximate a surface inside each grid cell in the first set of grid cells using a local line segment, the local line segment corresponding to a shape of the surface inside each grid cell in the first set of grid cells;

a template surface estimator configured to estimate a first template surface representation for the first set of grid cells using original poses of the plurality of laser scans and to estimate a second template surface representation for a second set of grid cells using updated poses for the plurality of laser scans; and a laser scan aligner configured to align each laser scan in the plurality of laser scans to the estimated first template surface representation to provide the updated pose for each laser scan in the plurality of laser scans.

7. The system of claim 6, wherein the grid generator is configured to determine a first normal orientation of a first set of scan points within each grid cell of the first set of grid cells, further configured to determine a second normal orientation of a second set of scan points within each grid cell of the first set of grid cells, wherein the second normal orientation is different from the first normal orientation, and further configured to approximate the surface inside each grid cell in the first set of grid cells using the first and second local line segments corresponding to the respective first and second normal orientations.

8. The system of claim 6, wherein the template surface estimator is configured to perform principal component analysis for each grid cell of the respective first and second set of grid cells and further configured to recover the local line segment and the standard deviations of laser scan points relative to the local line segment for each grid cell in the respective first and second set of grid cells.

9. A computer-implemented method for laser scan alignment comprising:

splitting, by a laser scan alignment computer, an area covered by a plurality of laser scans into a set of grid cells;

estimating, by the laser scan alignment computer, a first template surface representation for the set of grid cells using original poses of the plurality of laser scans, the first template surface representation having a first resolution;

aligning, by the laser scan alignment computer, each laser scan in the plurality of laser scans to the estimated first template surface representation to provide a first updated pose for each laser scan in the plurality of laser scans;

estimating, by the laser scan alignment computer, a second template surface representation for the set of grid cells using the first updated poses for the plurality of laser scans, the second template surface representation having a second resolution, wherein the second resolution of the second template surface representation is finer than the first resolution of the first template surface representation;

aligning, by the laser scan alignment computer, the plurality of laser scans to the second template surface representation to provide a second updated pose for each laser scan in the plurality of laser scans;

providing, by the laser scan alignment computer, the second template surface representation to a display as a map of the area covered by the plurality of laser scans;

dividing, by the laser scan alignment computer, the plurality of laser scans into overlapping groups of laser scans, wherein the splitting the area covered by the plurality of laser scans into the set of grid cells comprises splitting the area covered by each group of laser scans in the overlapping groups of laser scans into the set of grid cells, wherein the aligning each laser scan in the plurality of laser scans to the estimated first template surface representation comprises aligning, by the laser scan alignment computer, each group of laser scans in the overlapping groups of laser scans to the estimated first template surface representation to provide the first updated pose for each group of laser scans in the overlapping groups of laser scans, and wherein the aligning each laser scan in the plurality of laser scans to the estimated second template surface representation comprises aligning, by the laser scan alignment computer, each group of laser scans in the overlapping groups of laser scans to the estimated second template surface representation to provide the second updated pose for each group of laser scans in the overlapping groups of laser scans; and estimating, by the laser scan alignment computer, the first template surface representation for the set of grid cells using the second updated pose for each group of laser scans in the overlapping groups of laser scans, the first template surface representation having a third resolution, wherein the third resolution of the first template surface representation is finer than the second resolution of the second template surface representation.

* * * * *

UNITED STATES PATENT AND TRADEMARK OFFICE
CERTIFICATE OF CORRECTION

| | | |
|---|---|---|
| PATENT NO. | : 8,209,143 B1 | |
| APPLICATION NO. | : 12/881929 | |
| DATED | : June 26, 2012 | |
| INVENTOR(S) | : Anguelov et al. | |

It is certified that error appears in the above-identified patent and that said Letters Patent is hereby corrected as shown below:

Column 15
Line 19, Claim 1, please replace "mea" with --area--.

Signed and Sealed this
Thirtieth Day of October, 2012

David J. Kappos
*Director of the United States Patent and Trademark Office*